US007004647B2

(12) United States Patent
Malagrino, Jr. et al.

(10) Patent No.: US 7,004,647 B2
(45) **Date of Patent: *Feb. 28, 2006**

(54) OPTICAL TRANSCEIVER BAIL LATCH

(75) Inventors: Gerald Daniel Malagrino, Jr., Rochester, MN (US); Michael L. Zumbrunnen, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,604

(22) Filed: May 24, 2004

(65) Prior Publication Data

US 2004/0240801 A1 Dec. 2, 2004

Related U.S. Application Data

(60) Provisional application No. 60/475,030, filed on Jun. 2, 2003.

(51) Int. Cl.
*G02B 6/36* (2006.01)

(52) U.S. Cl. .......................... 385/92; 385/88; 439/372

(58) Field of Classification Search ............ 385/88–94; 257/81, 99, 100, 433, 434, 678; 361/728–745, 361/752–759; 439/157, 372, 638
See application file for complete search history.

(56) References Cited

U.S. PATENT DOCUMENTS

| | | | | |
|---|---|---|---|---|
| 5,901,263 | A | 5/1999 | Gaio et al. | 385/92 |
| 6,439,918 | B1 | 8/2002 | Togami et al. | 439/372 |
| 6,666,484 | B1 | 12/2003 | Branch et al. | 292/128 |
| 6,916,123 | B1 * | 7/2005 | Kruger et al. | 385/92 |
| 2003/0171022 | A1 | 9/2003 | Distad et al. | 439/372 |
| 2003/0236019 | A1 | 12/2003 | Hanley et al. | 439/372 |

* cited by examiner

*Primary Examiner*—Phan T. H. Palmer
(74) *Attorney, Agent, or Firm*—Allen, Dyer, Doppelt, Milbrath & Gilchrist, P.A.

(57) ABSTRACT

The invention relates to a bail latching device for an opto-electronic transceiver, including a pivotal latching member and a bail. The bail includes ends extending at an acute angle from a plane defined by the side arms for pivoting the latching member when the bail is rotated from a rest position to a removal position. Ideally, in the rest position, the side arms of the bail extend downwardly on each side of a front end of the transceiver. In the removal position, the bail is parallel to a removal direction, whereby the bail rotates the latching member to an unlatching position and then provides a handle to grasp while removing the transceiver from a standard cage.

14 Claims, 6 Drawing Sheets

OPTICAL TRANSCEIVER BAIL LATCH

CROSS-REFERENCE TO RELATED APPLICATIONS

The present invention claims priority from U.S. Patent Application No. 60/475,030 filed Jun. 2, 2003, which is incorporated herein by reference.

TECHNICAL FIELD

The present invention relates to a latching device for an optical transceiver, and in particular to a pivoting bail latching device used for latching an optical transceiver within a standard cage.

BACKGROUND OF THE INVENTION

With the advent of "hot pluggable" optical transceivers, latching devices have become a popular safety feature to ensure that the transceiver module is held within the guide rail or cage until purposely removed. Bail latching devices have become particularly popular, due to their functional and ergonomic advantages. Previous bail designs are disclosed in U.S. Pat. No. 5,901,263 issued to IBM Corp., and U.S. Pat. No. 6,439,918 issued to Finisar Corp. The bail in the IBM device forces plastic arms, which are normally biased inwardly, outwardly into engagement with the guide rail system. The bail in the Finisar device pivots a separate pivoting latch member, which is normally biased into engagement with the cage by a specially designed extension of the housing. The Finisar device, in particular, includes a specially designed bail with a loop or cam portion requiring a complex assembly process to ensure that the bail, the pivoting latch member and the housing all interact correctly. Other bail latching devices for optical transceivers are disclosed in United States Published Patent Applications Nos. 2003/171022 published Sep. 11, 2003 in the name of Distad et al, and 2003/236019 published Dec. 25, 2003 issued to Hanley et al.

An object of the present invention is to overcome the shortcomings of the prior art systems by providing a simple bail latching device.

SUMMARY OF THE INVENTION

Accordingly, the present invention relates to a hot-pluggable optical transceiver device for mounting in a host device comprising:

an optical sub-assembly for converting electrical signals into optical signals or optical signals into electrical signals;

a housing supporting the optical sub-assembly hot pluggable into the host device along an insertion direction;

an optical connector for receiving an optical fiber for transmitting the optical signals;

an electrical connector for transmitting the electrical signals between the optical sub-assembly and the host device;

a latch pivotally mounted on the housing between a latched and an unlatched position for holding the housing in the host device; and a bail pivotally mounted on the housing for pivoting between a rest and a removal position, in which the latch is pivoted into the unlatched position, the bail including:

a grip portion extending transverse to the optical connector;

first and second side arms extending perpendicularly from the grip portion and parallel to each other, defining a rotation plane; and first and second lever arms extending from the first and second side arms, respectively, out of the rotation plane for applying a force to the latch when rotated into the removal position.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
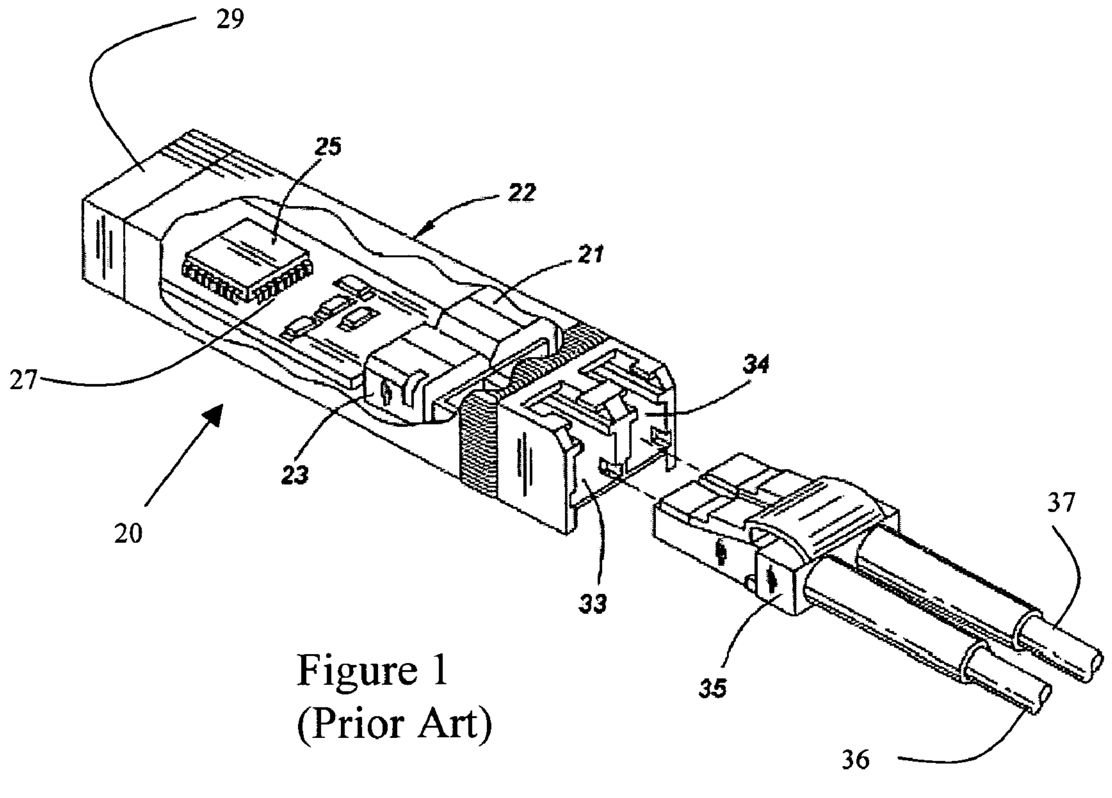
FIG. 1 is an isometric view of a conventional transceiver.

With reference to FIG. 1, a conventional opto-electronic transceiver 20 includes a receiver optical sub-assembly (ROSA) 21, for receiving optical signals and for converting them into electrical signals, mounted in a housing 22. A transmitter optical sub-assembly (TOSA) 23, for receiving electrical signals and converting them to optical signals, is mounted adjacent to the ROSA 21 within the housing 22. Electronic circuitry 25 is provided on circuit board 27 for controlling the various functions of the transceiver 20. An electrical connector 29 is provided at the rear end of the transceiver 20 for electrically connecting the transceiver 20 to a host device. The electrical connector 29 can take many different forms, but the most prevalent is the card edge or ribbon-style connector.

The front end of the transceiver 20 includes a pair of optical connector ports 33 and 34 for receiving a standard duplex optical connector 35, which includes ends of a transmitting optical fiber 36 and a receiving optical fiber 37.

Figure 2:
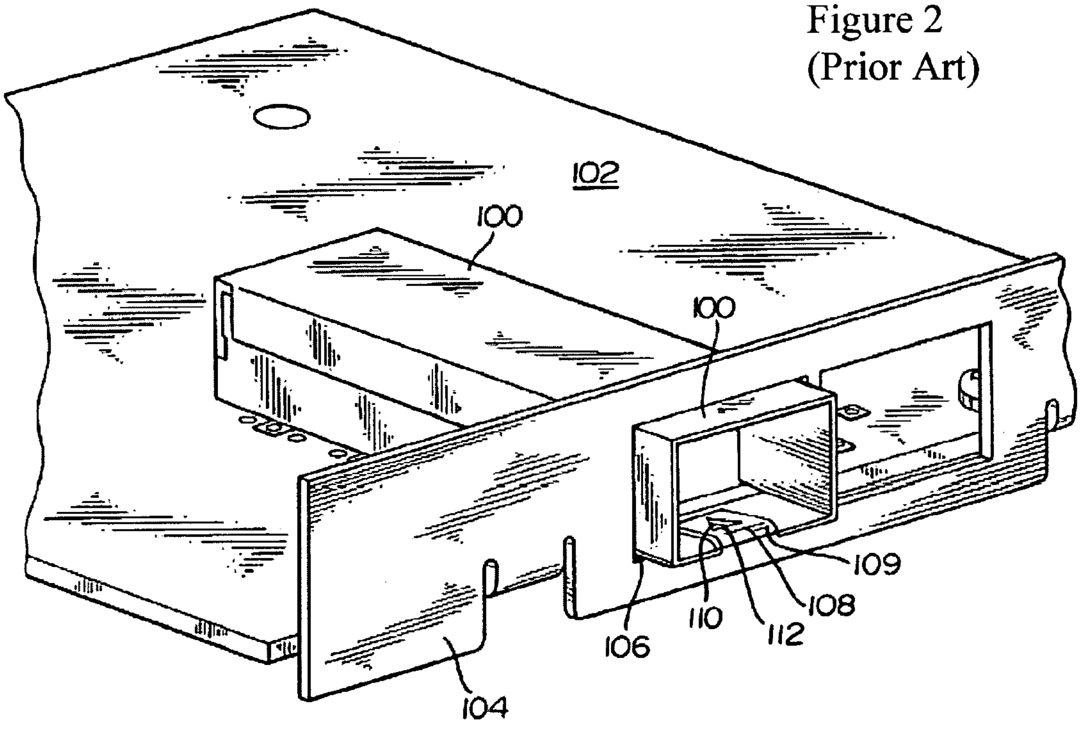
FIG. 2 is an isometric view of a standard cage of a host device for a pluggable transceiver.

With reference to FIG. 2, pluggable opto-electronic transceivers are conventionally received in a metal mounting cage 100, which is mounted on a circuit board 102 of a host device. A mounting bezel 104, including access holes 106, is provided on the host device to define the openings for the cages 100 and protect the remainder of the circuit board 102. An opening 108 of the cage 100 includes a bent tongue portion 109. A triangular hole 110 is formed in the bent tongue portion 109, and includes a front abutment shoulder 112, for reasons that will be explained hereinafter.

Figure 3:
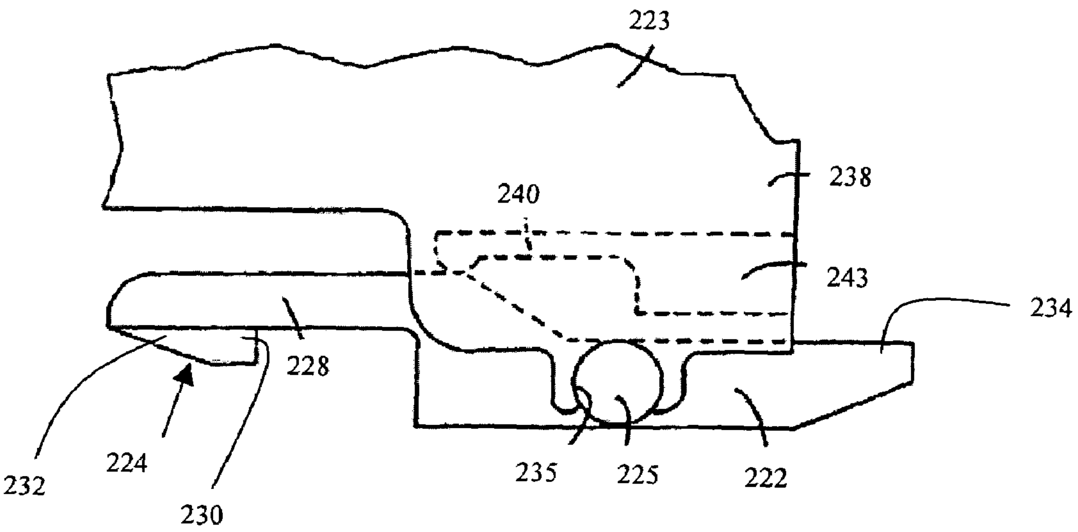
FIG. 3 is a side view of a conventional latch mounted on a transceiver.
Figure 4:
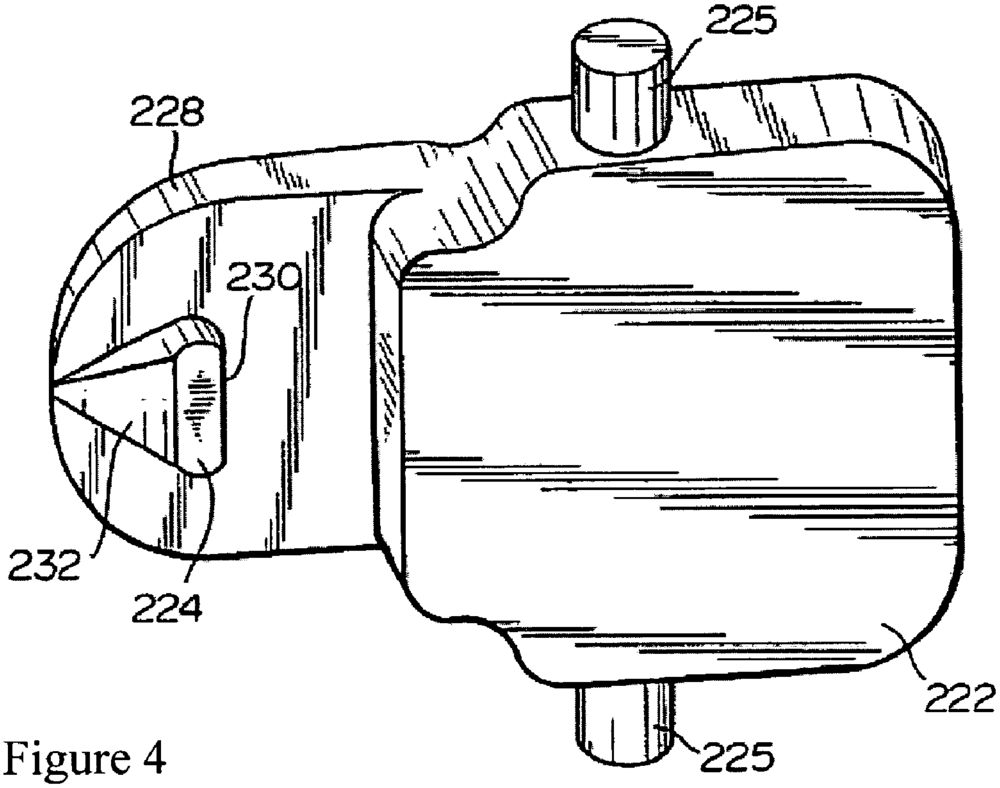
FIG. 4 is an isometric view of a conventional latch.

FIGS. 3 and 4 illustrate a conventional pivoting latch 222 mounted on a transceiver housing 223, as defined in U.S. Pat. No. 6,666,484 issued Dec. 23, 2003 to Branch et al, which is incorporated herein by reference. The pivoting latch 222 includes a latch hook 224 extending from a latching arm 228. The latch hook 224 is received in the triangular hole 110, when a transceiver is inserted into the cage 100, for locking the transceiver housing 223 therein. The latch hook 224 includes a ramped front surface 232 for engaging the bent tongue portion 109 during insertion of the transceiver housing 223, and a vertical rear surface 230 for engaging the front abutment shoulder 112 when locked in the cage 100. A manually engageable surface 234, extending outwardly from the front of the transceiver housing 223, enables the pivoting latch 222 to be rotated from a latched to an unlatched position by a user during withdrawal of the device. The pivoting latch is rotated (clockwise in FIG. 3) until the latch look 224 is disengaged from the front abutment shoulder 112, which enables the transceiver housing 223 to be easily pulled out of the cage 100.

Bearing rods 225 extend outwardly from the sides of the pivoting latch 222, and are snap fit into bushings 235 extending downwardly from each side 238 of the transceiver housing 223. Various methods have been provided for biasing the pivoting latch 222 into the latched position including the use of spring fingers 240 extending from a body 243, which is provided on the underside of the transceiver housing 223. Alternatively, a resilient portion of the transceiver housing or EMI shield can be extended to bias the pivoting latch into the latched position.

Figure 5:
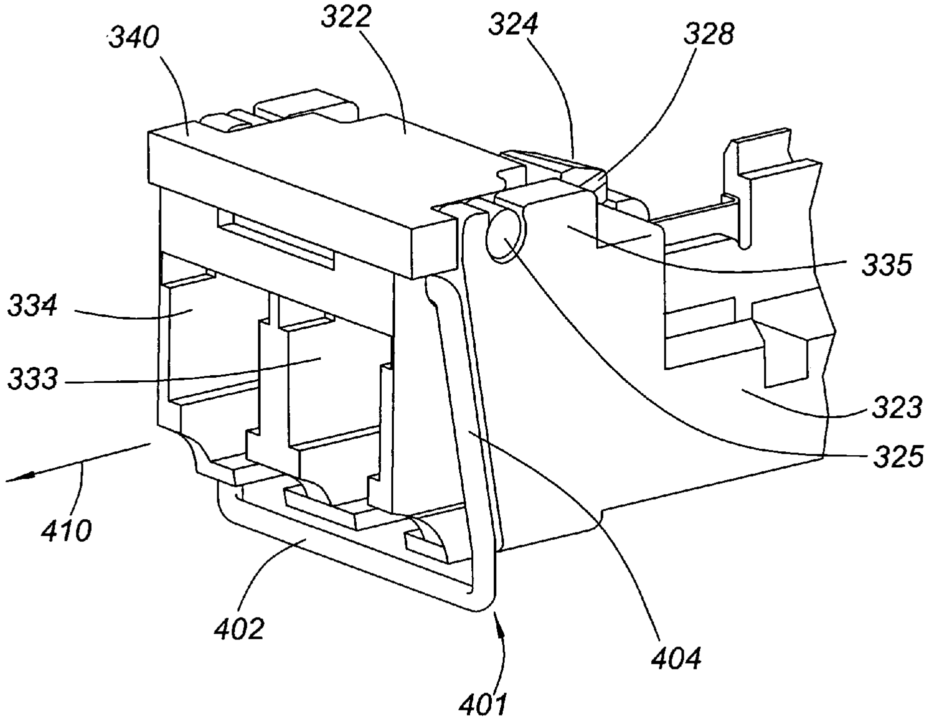
FIG. 5 is a transceiver with bail latch according to the present invention.
Figure 6:
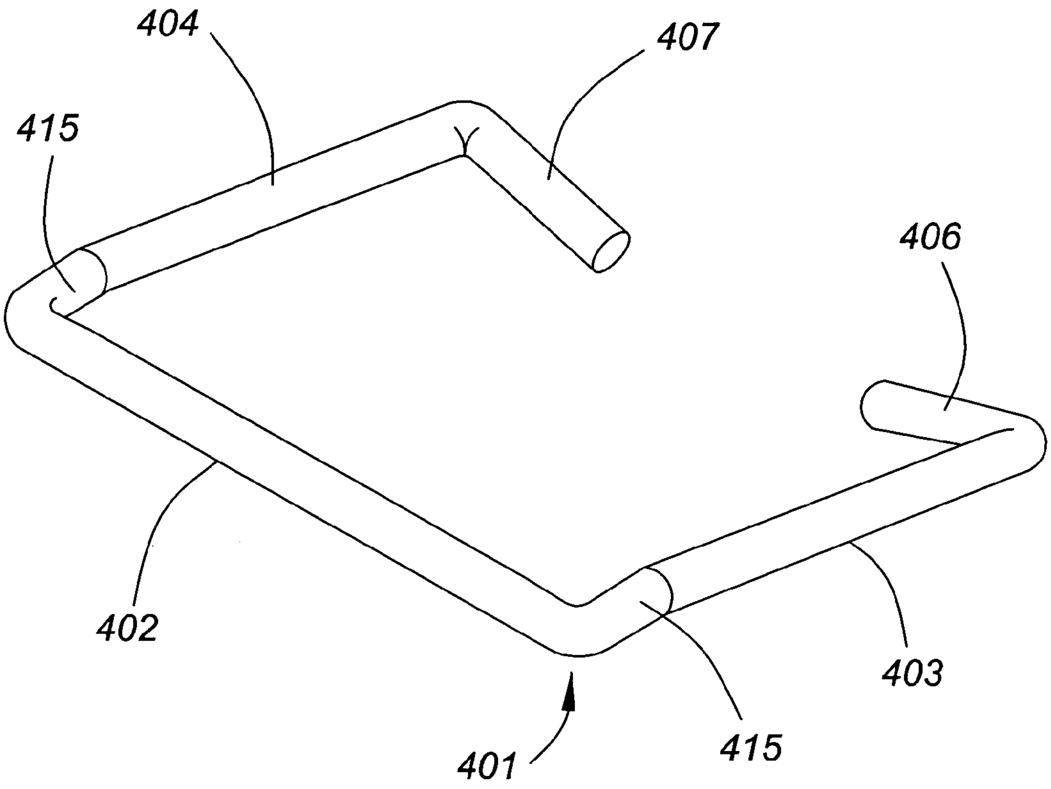
FIG. 6 is an isometric view of the bail of FIG. 5.

With reference to FIGS. 5 and 6, the bail latching device according to the present invention includes a pivoting latch 322, substantially the same as the aforementioned pivoting latch 222, with a latch hook 324 extending from a latching arm 328. The manually engageable surface 234 is replaced by a reinforced block 340 for reasons discussed hereinbelow. As above, a transceiver housing 323 includes a bushing 335 for receiving pivoting rods 325 extending from the pivoting latch 322, and optical connectors 333 and 334 provided for reasons discussed above.

A single piece bail 401, including a grip portion 402, first and second side arms 403 and 404, and first and second lever arms 406 and 407, is provided to facilitate rotation of the pivoting latch 322. Preferably, the width of the grip portion 402 is less than the width of the transceiver housing 323 to ensure that there is no interference with other adjacent transceivers. Preferably, the first and second side arms 403 and 404 extend below the lower surface of the transceiver housing 323 to facilitate the grasping of the grip portion 402; however, a tab extending from the grip portion 402 (not shown) can be provided to facilitate grasping, if the dimensions of the bail 401 are to fit within the end dimensions of the transceiver housing 323.

Figure 7:
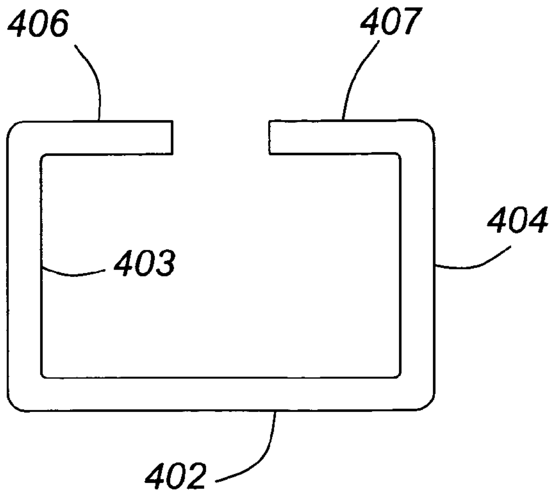
FIG. 7 is a top view of the bail according to the present invention.
Figure 8:
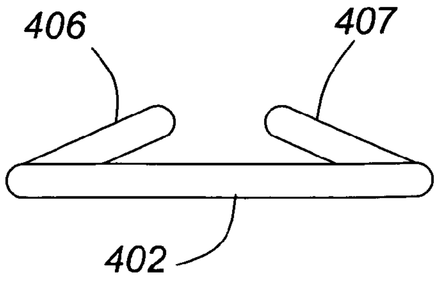
FIG. 8 is an end view of the bail of FIG. 7.

The first and second side arms 403 and 404 are parallel to each other, and define a plane of rotation therebetween. While in a rest position, corresponding to the latched position of the pivoting latch 322, the first and second side arms 403 and 404 extend on either side of the optical connectors 333 and 334 (FIG. 5). The first and second lever arms 406 and 407 extend diagonally out of the rotation plane, and ideally, substantially perpendicular to the first and second side arms 403 and 404 (FIG. 7), whereby rotation of the bail 401 will result in the first and second lever arms 406 and 407 engaging the reinforced block 340, thereby rotating the pivoting latch 322 and disengaging the latch hook 324 from the triangular hole 110. Typically the first and second lever arms 406 and 407 are at an acute angle $\alpha$, e.g. from 12° to 18°, preferably 15°, from the plane of rotation (FIG. 8) . Rather than being perpendicular to the first and second side arms 403 and 404, the first and second lever arms 406 and 407 can also form acute angles or obtuse angles with the first and second side arms 403 and 404, respectively, depending on the rest position of the bail 401 and the amount of rotation required of the pivoting latch 322. When the rest position of the bail 401 is not vertical, the ends of the side arms 403 and 404 are provided with a bend 415 proximate the grip portion 402. The bend 415 ensures that the end of the side arms 403 and 404 are at least vertical and perhaps beyond vertical, i.e. bent towards the front of the transceiver, to facilitate access to and gripping of the grip portion 402.

To facilitate removal, the bail 401 is able to rotate substantially 80° to 100° to a substantially horizontal removal position, whereby the bail 401 is parallel to an insertion/removal direction, indicated by arrow 410. A shoulder or stop is provided on the transceiver housing 323 to ensure the bail 401 does not go beyond the removal position. In this position the bail 401, in particular the grip portion 401, provides a handle for pulling the transceiver 323 from the cage 100.

We claim:

1. A hot-pluggable optical transceiver device for mounting in a host device comprising:
- an optical sub-assembly for converting electrical signals into optical signals or optical signals into electrical signals;
- a housing supporting the optical sub-assembly hot pluggable into the host device along an insertion direction;
- an optical connector for receiving an optical fiber for transmitting the optical signals to the optical sub-assembly;
- an electrical connector for transmitting the electrical signals between the optical sub-assembly and the host device;
- a latch pivotally mounted on the housing between a latched and an unlatched position for holding the housing in the host device; and
- a bail pivotally mounted on the housing for pivoting between a rest and a removal position, in which the latch is pivoted into the unlatched position, the bail including:
  - a grip portion extending transverse to the optical connector;
  - first and second side arms extending perpendicularly from the grip portion and parallel to each other, defining a rotation plane; and
  - first and second lever arms extending from the first and second side arms, respectively, out of the rotation plane for applying a force to the latch when rotated into the removal position.

2. The device according to claim 1, wherein the first and second lever arms extend substantially perpendicular to the first and second side arms, respectively.

3. The device according to claim 2, wherein the first and second lever arms extend diagonally out of the rotation plane at an angle of substantially 12° to 18°.

4. The device according to claim 3, wherein the bail is a single piece of wire.

5. The device according to claim 2, wherein the first and second lever arms extend diagonally out of the rotation plane at an angle of substantially 15°.

6. The device according to claim 1, wherein in the removal position, the first and second side arms are disposed substantially parallel to the insertion direction.

7. The device according to claim 6, further comprising a shoulder on said housing to abut said first and second lever arms for preventing the bail from rotating past the removal position.

8. The device according to claim 1, wherein, in the rest position, the first and second side arms are disposed adjacent to the optical connector substantially perpendicular to the insertion direction.

9. The device according to claim 1, wherein a length of the gripping portion is less than a width of the housing to ensure the bail does not interfere with other adjacent transceivers.

10. The device according to claim 1, wherein the first and second side arms include a bend towards the front of the housing to facilitate access to the grip portion.

11. The device according to claim 1, wherein the first and second lever arms extend diagonally out of the rotation plane at an angle of substantially 12° to 18°.

12. The device according to claim 1, wherein the first and second lever arms extend diagonally out of the rotation plane at an angle of substantially 15°.

13. The device according to claim 1, wherein the bail is a single piece of wire.

14. The device according to claim 1, wherein the latch includes a latch hook on one end thereof for engaging a cage on the host device, and a block on the other end thereof for engaging the first and second lever arms.

* * * * *